United States Patent
Pagano

Patent Number: 5,255,040
Date of Patent: Oct. 19, 1993

[54] FILM CASSETTE AND LEADER

[75] Inventor: Daniel M. Pagano, Henrietta, N.Y.

[73] Assignee: Eastman Kodak Company, Rochester, N.Y.

[21] Appl. No.: 906,178

[22] Filed: Jun. 29, 1992

[51] Int. Cl.⁵ .......................... G03B 17/26; G03B 1/04
[52] U.S. Cl. ..................................... 354/275; 242/71.1
[58] Field of Search ........................ 354/275; 242/71.1

[56] References Cited

U.S. PATENT DOCUMENTS

| | | | |
|---|---|---|---|
| 1,921,560 | 8/1933 | Case | 95/31 |
| 4,455,076 | 6/1984 | Birkeland | 354/275 |
| 4,908,641 | 3/1990 | Fairman | 354/275 |
| 5,004,176 | 4/1991 | Niedospial | 354/275 |
| 5,049,928 | 9/1991 | Tirone | 355/72 |

FOREIGN PATENT DOCUMENTS 3-80243  4/1991  Japan .

Primary Examiner—Michael L. Gellner
Assistant Examiner—Nicholas J. Tuccillo
Attorney, Agent, or Firm—Roger A. Fields

[57] ABSTRACT

A film cassette comprises a lighttight housing, a spool rotatably supported inside the housing, a filmstrip wound onto the spool, a film leader attached to a leading end of the filmstrip, and a sprocket coaxially connected to the spool with identical pitch teeth adapted to be received in respective perforations along an edge section of the leader wider than the filmstrip for advancing the leader (but not the filmstrip) from the housing when the sprocket and the spool are rotated in a film unwinding direction. Among the perforations that receive the teeth the perforation closest to the filmstrip is longer than the others to allow anyone of the teeth to readily enter that perforation when the leader is wound onto the spool after the filmstrip.

5 Claims, 2 Drawing Sheets

FILM CASSETTE AND LEADER

BACKGROUND OF THE INVENTION

1. Field of the Invention

The invention relates generally to the field of photography, and in particular to film cassettes. More specifically, the invention relates to a film cassette having an internal sprocket which when rotated in engagement with a film leader propels the leader from the film cassette.

2. Description of the Prior Art

Prior art Jap. Kokai No. 3-80243, filed Aug. 24, 1989 as Application No. 1-217860, and published Apr. 5, 1991, discloses a film cassette comprising a lighttight housing, a spool rotatably supported inside the housing, a filmstrip wound onto the spool, a film leader attached to a leading end of the filmstrip, and a sprocket coaxially connected to the spool with identical pitch teeth adapted to be received in respective perforations along an edge section of the leader wider than the filmstrip for advancing the leader (but not the filmstrip) from the housing when the sprocket and the spool are rotated in a film unwinding direction. The perforations in the leader each have the same length. Consequently, when the leader is wound onto the spool after the filmstrip by action of the filmstrip pulling in the leader, it appears difficult for anyone of the teeth to align with the perforation closest to the filmstrip. Thus, the teeth and the perforations may not engage one another. Moreover, since there will result several convolutions of the leader, the increased diameter of an outer convolution as compared to an inner convolution makes it difficult to place the teeth in the perforations along the outer convolution after they are received in the perforations along the inner convolution.

Prior art U.S. Pat. No. 1,921,560, issued Aug. 8, 1933 discloses a film spool having a single radially projecting pin that extends through aligned holes in respective convolutions of a filmstrip coiled about the spool core. The spaces between the holes differ to allow the holes to be aligned to receive the pin as the filmstrip is wound onto the spool core.

SUMMARY OF THE INVENTION

A film cassette comprising a lighttight housing, a spool rotatably supported inside the housing, a filmstrip wound onto the spool, a film leader attached to a leading end of the filmstrip, a sprocket rotatably supported inside the housing with identical pitch teeth adapted to be received in respective perforations along an edge section of the leader wider than the filmstrip for advancing the leader from the housing when the sprocket and the spool are rotated, is characterized in that:

among the perforations that receive the teeth the perforation closest to the filmstrip is longer than the others to allow anyone of the teeth to readily enter that perforation when the filmstrip is wound onto said spool.

More particularly, the sprocket is coaxially connected to the spool for rotation with the spool to allow the leader to be wound onto the spool after the filmstrip to form an innermost convolution and an outermost convolution of the leader. The perforations in the leader at the innermost convolution gradually decrease in length outwardly, i.e. as they are located farther or away from the perforation closest to the filmstrip, to facilitate placement of the teeth into those perforations following receipt of one tooth into the perforation closest to the filmstrip. The perforations in the leader at the outermost convolution have identical lengths but their pitch gradually increases outwardly to compensate for the increased diameter of the outermost convolution as compared to the innermost convolution.

DETAILED DESCRIPTION OF THE PREFERRED EMBODIMENT

The invention is disclosed as being embodied in a 35 mm film cassette. Because the features of this type of film cassette are generally well known, the description which follows is directed in particular to elements forming part of or cooperating directly with the preferred embodiment. It is to be understood, however, that other elements not specifically shown or described may take various forms known to persons of ordinary skill in the art.

Figure 1:
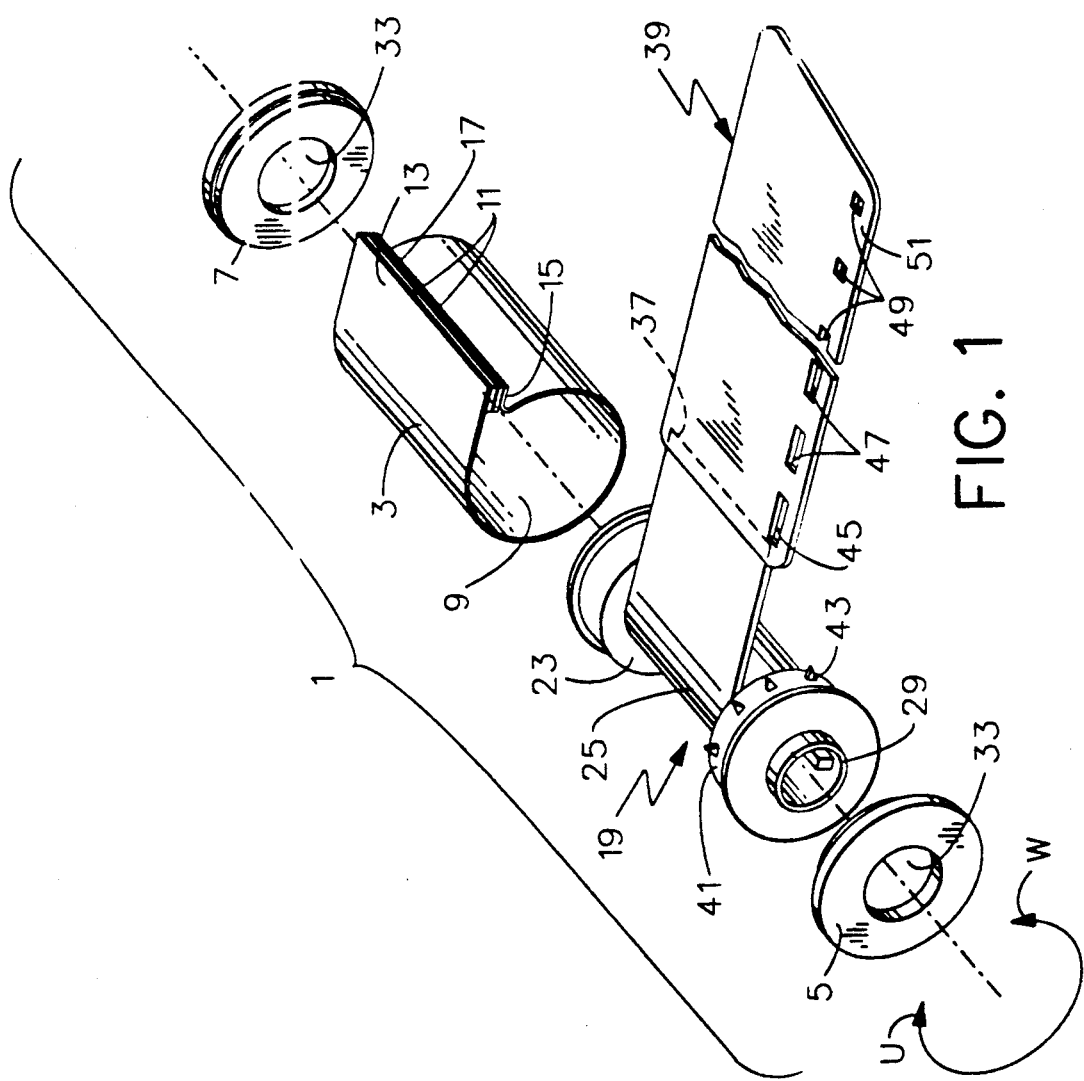
FIG. 1 is an exploded perspective view of a film cassette according to a preferred embodiment of the invention.
Figure 3:
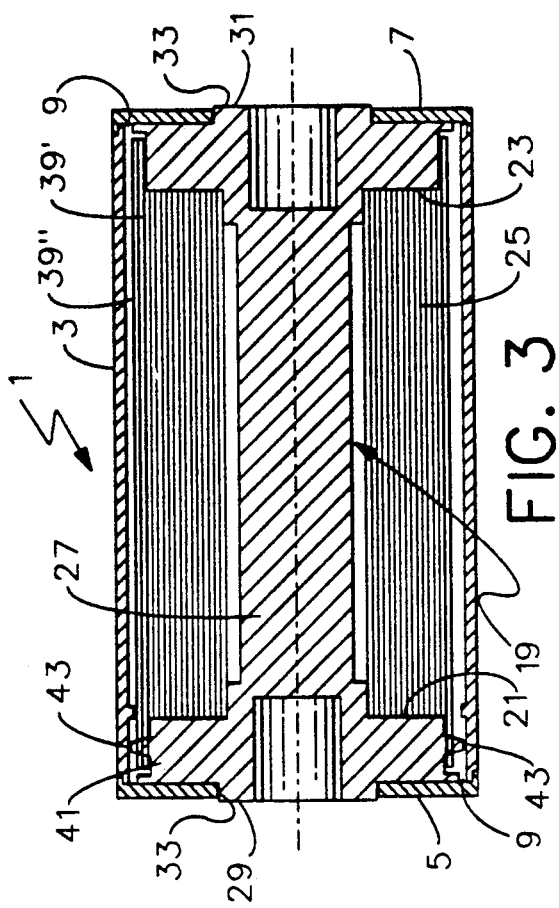
FIG. 3 is an elevation view in cross-section of the film cassette.
Figure 2:
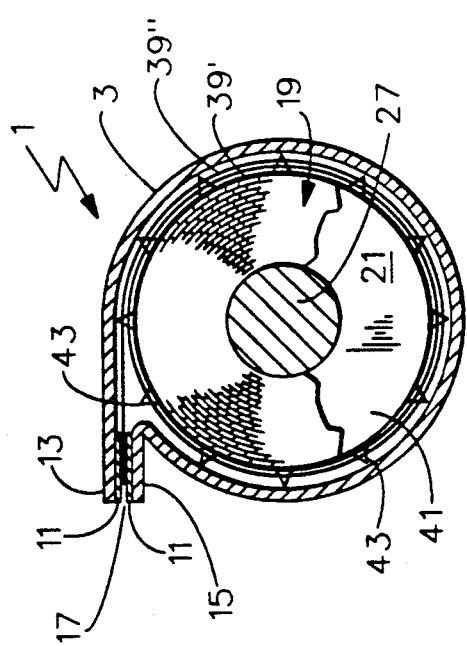
FIG. 2 is an end view in cross-section of the film cassette.
Figure 4:
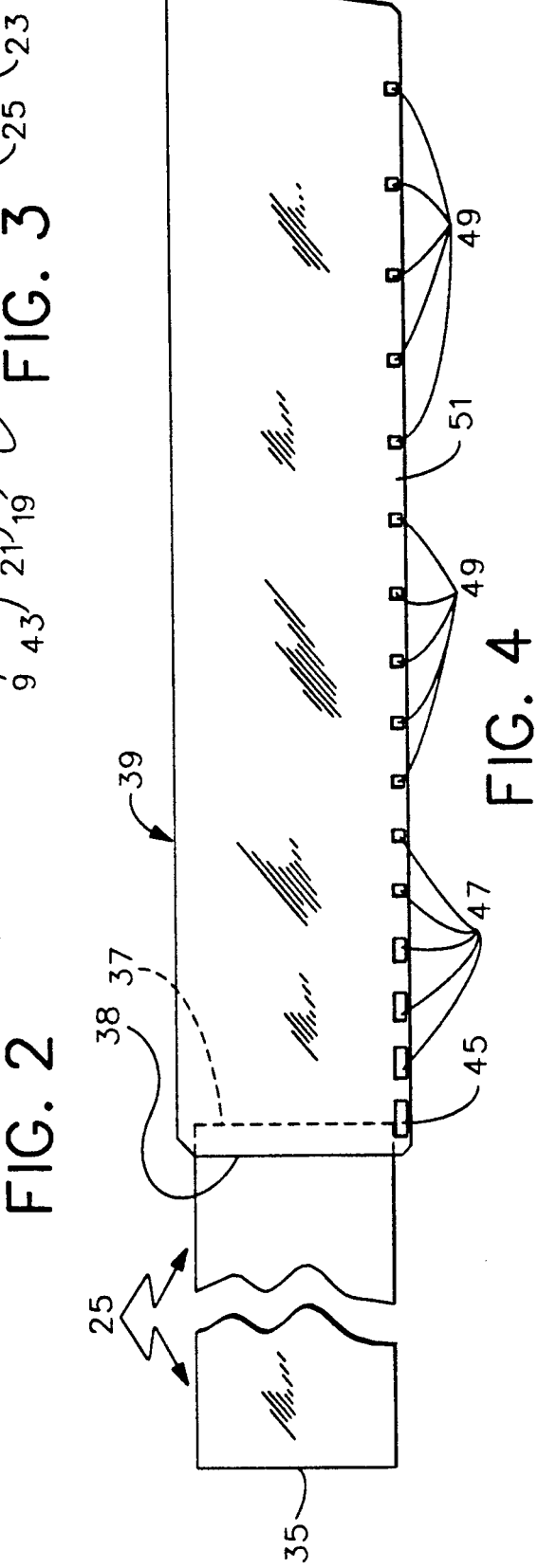
FIG. 4 is a plan view of a filmstrip and a wider film leader normally stored inside the film cassette.

FIGS. 1-3 show a film cassette 1 comprising a shell or housing consisting of a can 3 and a pair of identical end caps 5 and 7 which cover opposite end openings 9 of the can. A pair of identical black plush pads 11 are adhered to respective inner faces of two parallel lips 13 and 15 of the can 3. The two pads 11 define a lighttight film egress/ingress slot 17 between one another. A film spool 19 consists of a pair of flanges 21 and 23 between which a 35 mm filmstrip 25 is coiled in a roll about a spool core 27. The spool core 27 has a pair of shanks 29 and 31 which extend through respective openings 33 in the end caps 5 and 7 to rotatably support the film spool 19 inside the can 3. An inner or trailing end 35 of the of the filmstrip 25 is attached to the spool core 27 and an outer or leading end 37 of the filmstrip is attached to one end 38 of a film leader 39 that is wider than the filmstrip. See FIG. 4.

A sprocket 41 is integrally constructed with the flange 21 as shown in FIG.3. The sprocket 41 has a peripheral array of identical pitch teeth 43 adapted to be received in respective perforations 45, 47 and 49 along an edge section 51 of the film leader 39 as the leader is pulled in through the slot 17 from outside the can 3 to inside the can by the filmstrip 25 when the film spool 19 is rotated with the sprocket in a film winding direction W. See FIGS. 1-3. Conversely, the teeth 43 in engagement with the perforations 45, 47 and 49 operate to advance or propel the leader 39 outwardly through the slot 17 from inside the can 3 to outside the can when the film spool 19 is rotated with the sprocket in a film unwinding direction U.

The film leader 39 is of sufficient length to form an innermost convolution 39' and an outermost convolution 39" when it is wound onto the film spool 19 after the filmstrip 25 as shown in FIGS. 2 and 3. According to the invention, the perforation 45 (which is closest to the filmstrip 19) is longer than the other perforations 47 and 49. See FIG. 4. This is to allow anyone of the teeth 43 to readily enter the perforation 45 immediately before the leading end 37 of the filmstrip 19 is wound onto the film spool 19. When the leader 39 is wound onto the film spool 19, the perforations 45 and 47 are only at its innermost convolution 39' and the perforations 49 are only at its remaining convolutions including the outermost convolution 39". The perforations 47 have an identical pitch equal to the identical pitch of the teeth 43 but their respective lengths gradually decrease outwardly, i.e. as they are located farther or away from the perforation 45. This is to facilitate placement of the teeth 43 into the perforations 47 following receipt of one of the teeth in the perforation 45. The perforations 49 have identical lengths but their pitch gradually increases outwardly. This is to compensate for the differences in diameter between the respective convolutions of the leader 39 including the outermost convolution 39" as compared to the innermost convolution 39'.

The invention has been described with reference to a preferred embodiment. However, it will be appreciated that variations and modifications can be effected within the ordinary scope of the art without departing from the scope of the invention.

I claim:

1. A film cassette comprising a lighttight housing, a spool rotatably supported inside said housing, a filmstrip wound onto said spool, a film leader attached to a leading end of said filmstrip, a sprocket rotatably supported inside said housing with identical pitch teeth adapted to be received in respective perforations along an edge section of said leader wider than said filmstrip for advancing the leader from the housing when said sprocket and said spool are rotated, is characterized in that:

among said perforations that receive said teeth the perforation closest to said filmstrip is longer than the others to allow anyone of the teeth to readily enter that perforation when the filmstrip is wound onto said spool.

2. A film cassette as recited in claim 1, wherein at least some of said perforations that receive said teeth successively follow said perforation longer than the others and have an identical pitch corresponding to the identical pitch of the teeth but have respective lengths that progressively decrease as they are located farther from the perforation longer than the others.

3. A film cassette as recited in claim 1, wherein said sprocket is coaxially connected to said spool for rotation with the spool to allow said leader to be wound onto the spool after said filmstrip to form an innermost convolution and an outermost convolution of the leader, said perforations that receive said teeth at said innermost convolution have an identical pitch corresponding to the identical pitch of the teeth but their respective lengths gradually decrease outwardly, and said perforations that receive said teeth at said outermost convolution have identical lengths but their pitch gradually increases outwardly.

4. A combination of a filmstrip and a film leader attached at respective ends comprises a longitudinal series of perforations along an edge section of said leader wider than said filmstrip, and is characterized in that:

among said perforations the perforation closest to said filmstrip is longer than the others.

5. A combination as recited in claim 4, wherein at least some of said perforations successively follow said perforation longer than the others and have an identical pitch but have respective lengths that progressively decrease as they are located farther from the perforation longer than the others.

* * * * *